United States Patent [19]

Kaper et al.

[11] Patent Number: 4,602,558
[45] Date of Patent: Jul. 29, 1986

[54] APPARATUS FOR MAKING ONE OR MORE CONSUMPTION UNITS OF COFFEE

[75] Inventors: Louris Kaper, Barneveld; Daniel A. J. Dijs, Utrecht, both of Netherlands

[73] Assignee: Douwe Egberts Koninklijke tabaksfabriek koffiebranderijen-Theehandel N.V., Utrecht, Netherlands

[21] Appl. No.: 677,589

[22] Filed: Dec. 3, 1984

[51] Int. Cl.$^4$ ............................................. A47J 31/40
[52] U.S. Cl. ................................... 99/289 R; 99/287; 425/259
[58] Field of Search ................. 99/287, 289 R, 289 T, 99/289 D, 289 P, 279; 425/259, 260, 261, 256; 100/221, 223; 426/433

[56] References Cited

U.S. PATENT DOCUMENTS

| | | | |
|---|---|---|---|
| 1,903,362 | 4/1933 | McKinnis | 426/468 |
| 2,517,073 | 8/1950 | Alvarez | 99/289 |
| 2,899,885 | 8/1959 | Thompson | 99/289 R |
| 3,590,723 | 7/1971 | Dokos | 99/289 R |
| 4,317,649 | 3/1982 | Boellmann | 425/261 |

FOREIGN PATENT DOCUMENTS

| | | | |
|---|---|---|---|
| 404126 | 8/1963 | Switzerland | 99/287 |
| 934152 | 8/1963 | United Kingdom | 99/289 |

Primary Examiner—Robert W. Jenkins
Attorney, Agent, or Firm—Cushman, Darby & Cushman

[57] ABSTRACT

An apparatus for making one or more consumption units of coffee, comprising a coffee container, means for metering a portion of coffee at a metering station immediately prior to use, means for compacting the coffee in a compacting space at a compacting station, as well as means for transferring the coffee from the metering station to the compacting station and furthermore means for transferring the compacted coffee to an extraction unit connected to a hot water source. Extraction is effected more efficiently by compacting the coffee at a pressure on the coffee of about 1,000 kg/cm$^2$.

4 Claims, 4 Drawing Figures

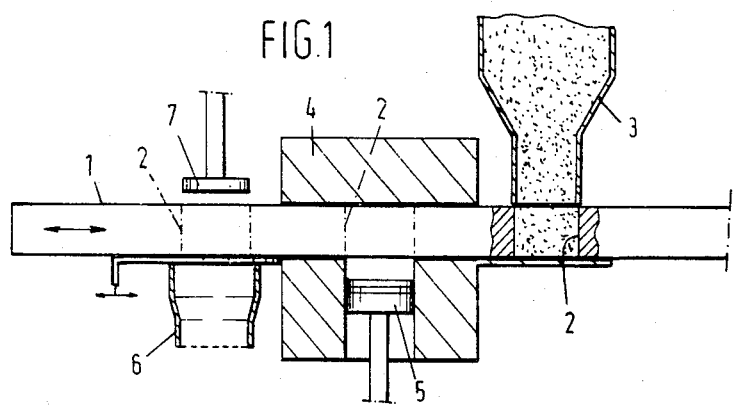
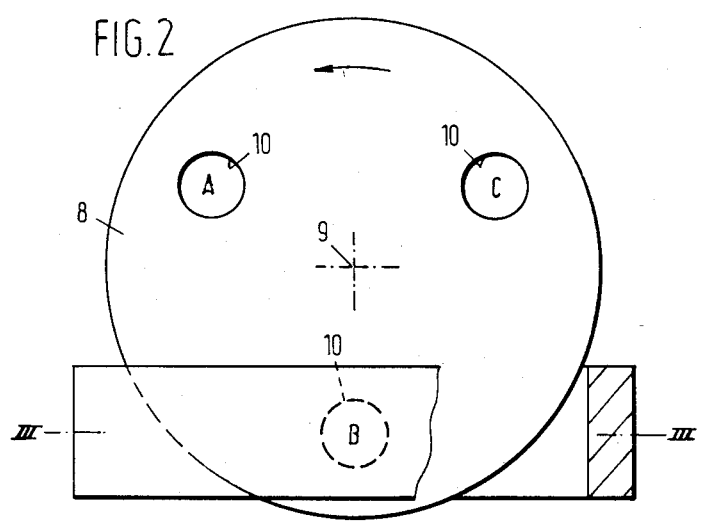
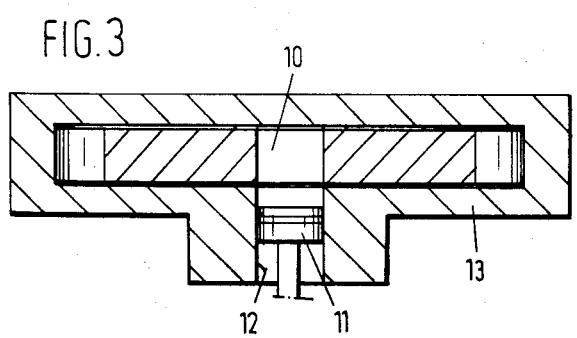

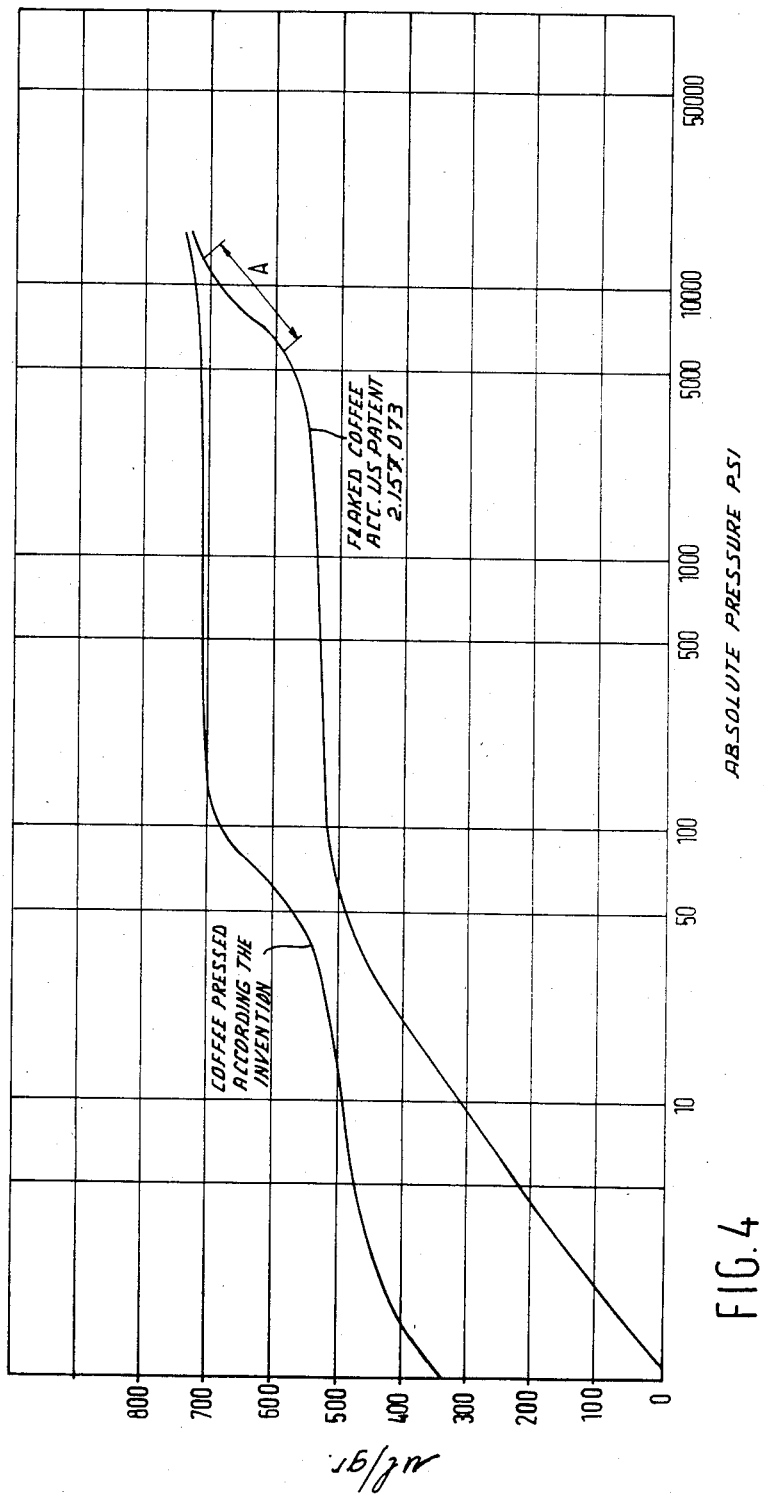

APPARATUS FOR MAKING ONE OR MORE CONSUMPTION UNITS OF COFFEE

It is well known to make a coffee beverage in a machine by means of hot water by dissolving a given quantity of coffee extract powder or instant coffee. A drawback thereof is that mainly volatile aroma components of the coffee are lost by the many operations during manufacture of the instant coffee or the coffee extract powder, so that the taste of the resulting coffee beverage differs strongly from coffee beverage made domestically.

To remove this drawback, machines have been developed wherein use is made of ground, roasted coffee. The quality of the coffee beverage obtained from these machines, too, is considerably inferior to that of coffee beverage made domestically as a result of the aroma components lost during grinding and storage of the ground coffee (aging effect).

Also known are machines for making one or more consumption units of coffee which comprise a coffee container, means for metering a portion of coffee immediately prior to use at a metering station, means for compacting the coffee in a compacting space at a compacting station, as well as means for transferring the coffee from the metering station to the compacting station and furthermore means for transferring the compacted coffee to an extraction unit connected to a hot water source.

Such an apparatus, serving for making a cup of coffee known by the name "Espresso", is described e.g. in U.S. Pat. No. 2,898,844. The ground product is then compacted in such a manner that when steam is added this does not immediately "run through" with condensation.

Since a minimum quantity of dry substance has to be extracted for obtaining a good cup of coffee, relatively much coffee is necessary in a coffee machine for one cup of coffee, in connection with the required short extraction time, bed resistance and fineness of the ground coffee.

It is an object of the present invention to eliminate this drawback.

To this end, the present invention provides an apparatus for making one or more consumption units of coffee, comprising a coffee container, means for metering a portion of coffee at a metering station, means for compacting the coffee in a compacting space at a compacting station, as well as means for transferring the coffee from the metering station to the compacting station and furthermore means for transferring the compacted coffee to an extraction unit connected to a hot water source, characterized in that compaction takes place at a pressure on the coffee of about 1,000 kg/cm$^2$.

It is observed that U.S. Pat. No. 2,517,073 describes an apparatus for making coffee, wherein the coffee beans are ground just before use. After grinding the particles are comminuted further to flakes by means of smooth rollers. The specification of this publication refers in column 4, lines 36 ff. to a high pressure and to the increase in extraction speed during the preparation of the coffee beverage.

Accordingly, in that apparatus, too compaction takes place immediately before extraction. In the prior apparatus, however, the extracted coffee is subjected to intermediate storage in a container. As appears from the drawings and the specification, the level of the liquid in the container is controlled by means of a float adapted to operate an electric circuit. This implies that the machine does not always produce a fresh cup of coffee, i.e. one for which the coffee is not extracted until a cup of coffee is desired.

It is observed in this connection that compaction means an operation in which all closed cells in the coffee are broken open, so that during extraction the soluble substances present in the cells are extracted rapidly and properly. This compaction is described e.g. in U.S. Pat. No. 1,903,362, but in the method described in that publication, compaction is effected immediately after the roasting of the coffee. It has been experimentally found that the percentage of cells broken open in the method of compaction according to the present invention is considerably higher than in case of compaction with rollers (see FIG. 4).

In a further embodiment of the invention, the said means for metering a portion of coffee may comprise a metering space, which is displaceable from the metering station at least to the compacting station and which is adapted to coact at that location as a compacting space with a punch driven hydraulically, mechanically or explosively.

Furthermore, the apparatus according to the invention for making one or more consumption units of coffee may comprise a horizontally arranged member movable into at least three positions and having at least one opening above which, in the first position, there is arranged a filling device, in the second position a punch or like compacting member and, underneath said opening in the third position an extracting device. In order to facilitate or improve the extraction, disintegration means may be disposed between the compacting station and the extraction unit.

Some embodiments of the apparatus for making one or more consumption units of coffee according to the invention will now be described, by way of example, with reference to the accompanying drawings, in which:

FIG. 1 is a diagrammatic cross-sectional view of a part of a first apparatus for making a consumption unit of coffee, with the slide in three different positions.

FIG. 2 is a top view of a second embodiment;

FIG. 3 is a cross-sectional view on the line II—II of FIG. 2; and

FIG. 4 is a diagram wherein a comparison is made of the percentage of cells broken open in coffee compacted by means of rollers and by pressing.

As shown in FIG. 1, an apparatus for making a consumption unit of coffee comprises a horizontally movable slide 1 having an opening 2. In the position shown, the opening 2 is underneath a filling device 3. Adjacent the filling device there is arranged a compacting device 4 fitted with a hydraulically operated plunger 5. It will be clear that the plunger is not moved until the slide 1 has been brought in the correct position above the plunger. After the coffee has been compacted by means of the plunger and the plunger has returned to the starting position, the slide is moved to a third position wherein an extraction unit 6 is disposed underneath the slide, while an ejector 7 is provided above the slide. Said ejector may be fitted at its bottom with e.g. a cross-shaped member, not further indicated, which, when the compacted coffe is ejected, ensures its disintegration. After the coffee has been brought in the extraction unit, this can be extracted in known manner by means of water.

The embodiments, shown, also diagrammatically, in FIGS. 2 and 3 differs from that shown in FIG. 1 in that instead of a slide 1, use is made of a round disc 8 rotatable about a centre 9. The disc can occupy three positions in principle, indicated by A, B and C, position A being the filling position, position B the compacting position and position C the position in which the compacted coffee is ejected into an extraction device.

In the compacting positon shown in FIGS. 2 and 3, the opening 10 of the disc 8 is precisely aligned with a plunger 11 arranged in a cylindrical opening 12 of a yoke-shaped member 13.

The devices described make it possible to hydraulically exert a pressure of approximately 1,000 kg/cm$^2$ on the coffee particles, thus ensuring that all or substantially all cells are broken. Both unbroken and broken, roasted coffee beans may serve as starting material.

The diagram shown in FIG. 4 shows the measuring results obtained with a mercury porosimeter in testing coffe compacted by the method according to the invention and of flaked coffee by the method described in U.S. Pat. No. 2,157,073. As appears from the diagram, the results in respect of the present invention are considerably more favourable: at a pressure of approximately 15,000 PSI=1,050 kg/cm$^2$ ("end point") the percentage of broken cells is about 90% when the present invention is used and about 70% in the case of the above U.S. patent. That not all cells are broken in the processing of the coffee by means of the apparatus according to the U.S. patent clearly appears from the last part of the flaked-coffee curve indicated by A, which part strongly slopes due to the breakage of a number of cells through the exerted mercury pressure.

It will be clear that a great many modifications are possible without departing from the scope of the invention.

We claim:

1. An apparatus for making at least one consumption unit of coffee comprising:

a container for holding unground coffee;

means for defining a metering station for metering a portion of unground coffee from said container, a compacting station and a extracting station and for transferring said metered portion to said compacting station from said metering station and from said compacting station to said extracting station;

means for compacting said portion at said compacting station including a punch for applying a pressure on the coffee of approximately 1,000 kg/cm$^2$ to break open all closed cells in the coffee; and means for transferring the compacted coffee at the extraction station to a hot water source for extraction to make said consumption unit.

2. Apparatus as in claim 1 wherein said defining and transferring means includes a slide having a opening there through with said container disposed above said slide for filling said opening when said opening is at said metering station, said punch below said opening when said opening is at said compacting station and said transferring means above said opening when said opening is at said transfer station.

3. Apparatus as in claim 1 wherein said compacting station is between said transfer station and said metering station.

4. Apparatus as in claim 1 wherein said defining and transferring means includes a rotatable disc with an opening therein.

* * * * *